United States Patent [19]

Sturtz, Jr.

[11] Patent Number: 4,574,927
[45] Date of Patent: Mar. 11, 1986

[54] FORWARD AND REVERSE CLUTCH ENGAGEMENT PARKING BRAKE

[75] Inventor: Charles R. Sturtz, Jr., Stevensville, Mich.

[73] Assignee: Clark Michigan Company, Buchanan, Mich.

[21] Appl. No.: 562,950

[22] Filed: Dec. 19, 1983

[51] Int. Cl.⁴ .............................................. B60K 41/28
[52] U.S. Cl. .................................................... 192/4 C
[58] Field of Search ............ 192/4 A, 4 C, 4 B, 87.1, 192/87.11, 87.13, 51; 74/869, 868, 867

[56] References Cited

U.S. PATENT DOCUMENTS

| | | | |
|---|---|---|---|
| 2,963,945 | 12/1960 | Barker et al. | 192/4 C |
| 3,631,950 | 1/1972 | Tanaka | 192/4 A |
| 3,651,904 | 3/1972 | Snoy et al. | 192/4 A |
| 3,729,074 | 4/1973 | Anderson et al. | 192/4 C |
| 3,978,946 | 9/1976 | Ream | 192/4 A |
| 3,994,374 | 11/1976 | Gill | 192/4 A |
| 4,273,224 | 6/1981 | Brown et al. | 192/4 A |

Primary Examiner—George H. Krizmanich
Attorney, Agent, or Firm—Kenneth C. Witt; John C. Wiessler

[57] ABSTRACT

A supplemental parking brake for a vehicle having a power shift transmission which includes a hydraulically operated forward clutch which is selectively engaged to put the transmission in the forward operating mode and a hydraulically operated reverse clutch which is selectively engaged to put the transmission in the reverse operating mode. The supplemental parking brake is applied automatically when the regular parking brake is applied if a predetermined condition prevails. Such condition prevails if the power transmission of the vehicle has been shifted by appropriate controls to either the forward operating mode or the reverse operating mode.

11 Claims, 3 Drawing Figures

FORWARD AND REVERSE CLUTCH ENGAGEMENT PARKING BRAKE

BACKGROUND OF THE INVENTION

1. Field of the Invention

This invention relates to parking brakes for vehicles, and more particularly to a supplemental parking brake which may be applied automatically when the regular parking brake is applied. This invention is particularly useful in earthworking vehicles but is not limited to such use.

2. Description of the Prior Art

It is known in the prior art to interconnect a parking brake with the controls of a power shift vehicle transmission to cause the transmission to be shifted to neutral or vented, stopping drive through the power train of the vehicle when the parking brake is applied, as shown in U.S. Pat. Nos. 3,729,074 Anderson et al and 3,978,946 Ream.

U.S. Pat. No. 3,651,904 Snoy et al teaches that two of the friction clutches in a powershift transmission can be engaged simultaneously to act as a brake for the vehicle. The two clutches normally are range clutches, and a first one of them is engaged for the first and second gear ratios of the transmission, while the second clutch is engaged for the third and fourth gear ratios. If the second clutch is engaged the first clutch may be selectively engaged also, after which the second clutch then slips, providing an inertia brake, until a shaft which is common to both clutches stops and the transmission is locked up.

SUMMARY OF THE INVENTION

The present invention provides a supplemental parking brake for a vehicle having a powershift transmission which includes forward and reverse operating modes, including a hydraulically operated forward clutch which is selectively engaged to put the transmission in the forward operating mode and a hydraulically operated reverse clutch which is selectively engaged to put the transmission in the reverse operating mode. The vehicle includes a parking brake and an actuator for applying the parking brake, and the invention provides means responsive to the application of the parking brake for causing the forward and reverse clutches to be engaged simultaneously to provide a supplemental parking brake.

DESCRIPTION OF THE PREFERRED EMBODIMENT

Figure 1:
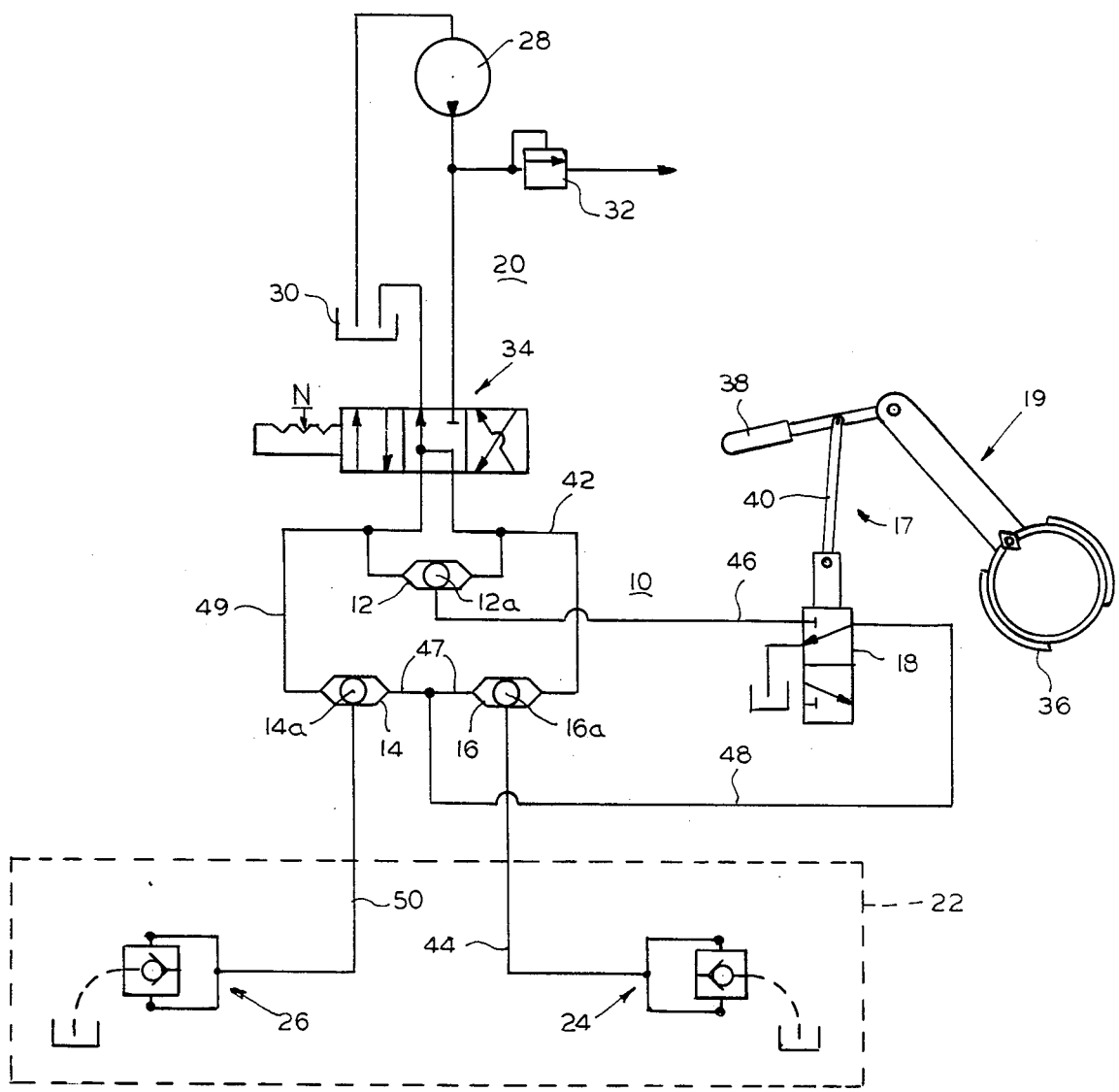
FIG. 1 of the drawing shows a diagram of the supplemental brake apparatus of this invention.

Referring to FIG. 1 of the drawing the numeral 10 indicates generally a supplemental brake apparatus in accordance with the present invention which includes three shuttle valves 12, 14 and 16, interposed in the hydraulic control system 20 for the powershift transmission 22 of a vehicle. Each shuttle valve comprises an elongated chamber housing, a ball check member which has a neutral position at the center of said chamber and two operating positions at the ends of said chamber respectively. Also included in the supplemental brake apparatus 10 is a two-position valve 18 which is operated by a parking brake mechanism to be described.

Figure 2:
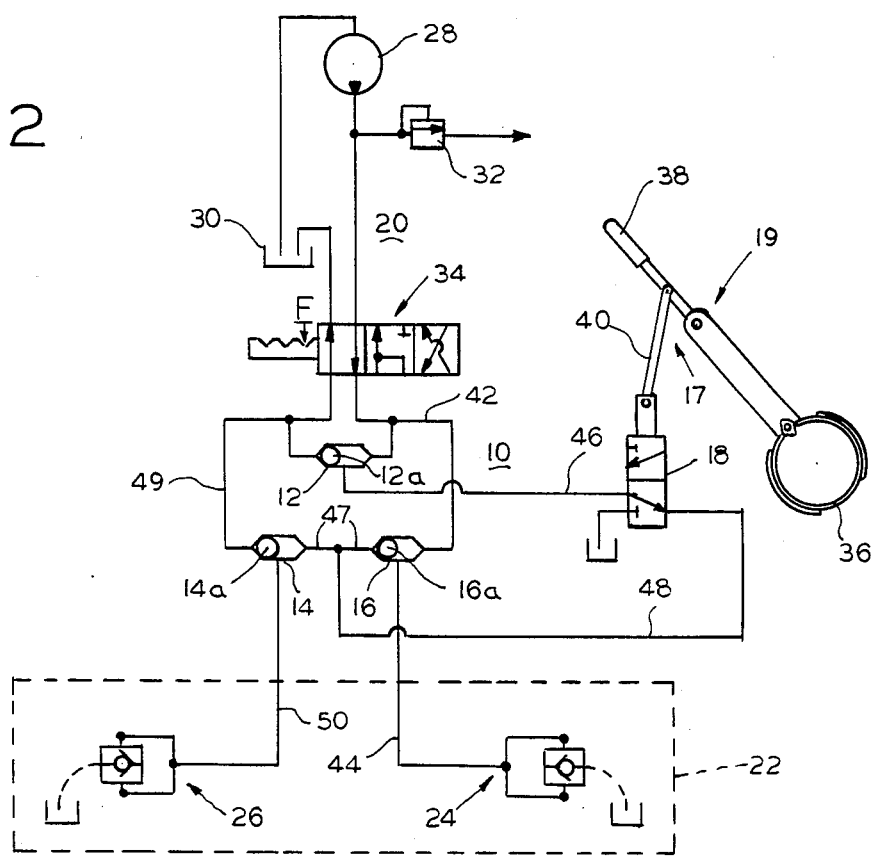
FIG. 2 shows the same apparatus as FIG. 1 with the associated powershift transmission controls in condition for forward drive.
Figure 3:
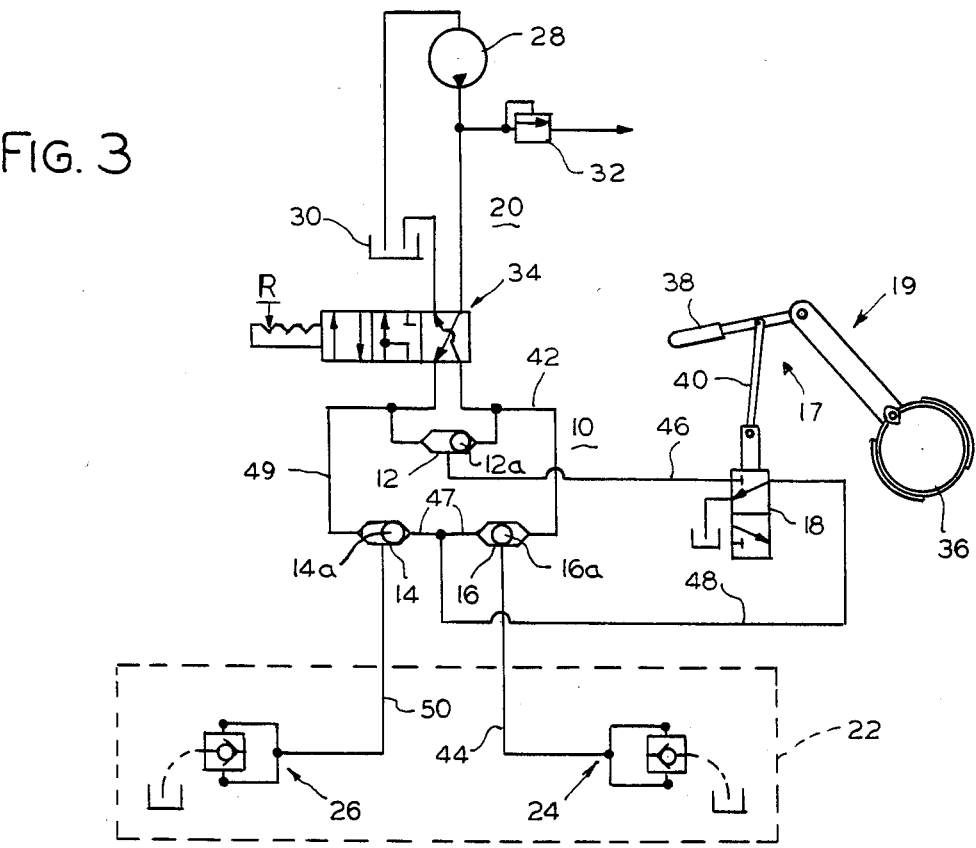
FIG. 3 shows the same apparatus as FIG. 1 with the transmission controls in condition for reverse drive by the powershift transmission.

On the drawing the numeral 20 indicates generally the hydraulic control system for a powershift transmission 22 which includes a multiple disc forward clutch 24 and a multiple disc reverse clutch 26. It will be understood that the powershift transmission may also have other hydraulically operated clutches for selecting two or more gear ratios for the powershift transmission. The hydraulic control system 20 includes a hydraulic pump 28 which withdraws hydraulic fluid from reservoir 30 and delivers pressurized hydraulic fluid for the operation of the control system. A regulating valve 32 may be provided to regulate the system pressure. A three-position control valve 34 having forward, neutral and reverse positions provides for pressurizing the forward clutch 24 of the transmission when the spool of valve 34 is moved from the neutral position of FIG. 1 to the forward position of FIG. 2 of the drawing. Control valve 34 also may be moved to a reverse position which is shown in FIG. 3 of the drawing.

Included in the control system 20 as a part of the present invention is a two-position valve 18 which is controlled by the position of a parking brake mechanism 19; the latter as shown at 36 is of the shoe type but it may be of any equivalent type. FIGS. 1 and 3 of the drawing show the parking brake 19 in the released position. FIG. 2 shows the parking brake in the applied position. As disclosed the parking brake has a manual actuator 17 which includes a handle 38; a link 40 interconnects the handle with valve 18 to move the valve 18 to either of its two positions responsively to the position of the parking brake 19.

FIG. 2 of the drawing shows the transmission control system 20 and the apparatus 10 of the present invention in the forward condition or mode for the vehicle, that is, valve 34 has been moved manually to the forward position. In such mode the pump 28 pressurizes forward clutch 24 through conduits 42 and 44. The pressurization of conduit 42 causes the movable ball checks 12a and 16a of the shuttle valves 12 and 16 respectively to move to the left to seal against loss of pressure from conduit 42; and with the ball check 16a of shuttle valve 16 to the left pressure is transmitted through conduit 44 to engage forward clutch 24. This is the forward operating mode for the vehicle.

If the parking brake 19 is applied when the control system 20 is in the mode of FIG. 2 the valve 18 is shifted from the drain position of FIG. 1 to the operating position of FIG. 2. This admits pressure from conduit 42 through check valve 12, conduit 46, valve 18 and conduit 48 to conduit 47 which interconnects shuttle valves 14 and 16, and thus to shuttle valve 14. The ball check member 14a of shuttle valve 14 moves to the left as shown in FIG. 2, and this causes reverse clutch 26 to become engaged through conduit 50. Thus, the parking brake is applied and the forward and reverse gear trains in the transmission are connected together. There is only one possible common speed when the two gear trains are connected together and such speed is zero. If the vehicle is stopped when the parking brake and the supplemental parking brake are applied the supplemental parking brake assists in holding the vehicle from moving. If the vehicle is moving when the parking brake and the supplemental parking brake are applied the supplemental brake assists the regular parking brake in stopping the vehicle.

It will be appreciated that the apparatus 10 also operates to apply the reverse and forward clutches simultaneously if the transmission is in the reverse condition as a result of the movement of valve 34 to the reverse position. This position of valve 34 is shown in FIG. 3 of the drawing; unlike FIG. 2, the parking brake is not applied in FIG. 3. In FIG. 3 the reverse clutch 26 is pressurized through conduits 49 and 50, and check valves 12 and 14 are in the positions shown in FIG. 3. If the transmission control valve remains the same as in FIG. 3 and the parking brake 19 is applied valve 18 is moved to its operating position which then pressurizes forward clutch 24 through the circuit including conduit 49, check valve 12, conduit 46, conduit 48, conduit 47, check valve 16 and conduit 44.

The use of a supplemental braking apparatus as described and claimed herein makes it possible to use a smaller parking brake than otherwise would be required. Usually such a parking brake is required to have sufficient braking effort that applying full power to the drive line of the vehicle would not cause the parking brake to slip; heretofore this was usually considered necessary to prevent the possibility of the operator inadvertently operating the machine with the parking brake applied. Another advantage over some prior art is that the integrity of the service brake system is not violated by incorporation therein of parking brake components, that is, there is no interconnection of the parking brake system with the service brake system as has been done in various ways in the prior art.

It is known that parking brake systems of the type disclosed and claimed herein are customarily used as emergency brakes as well as parking brakes. The operation of the transmission clutches according to the present invention provides a high capacity, independent emergency brake system.

Thus, while I have described and illustrated herein the best mode contemplated for carrying out my invention it will be appreciated that modifications may be made. Accordingly, it should be understood that I intend to cover by the appended claims all such modifications which fall within the true spirit and scope of my invention.

I claim:

1. A supplemental brake apparatus for a vehicle having a powershift transmission which includes forward and reverse operating modes, a hydraulically operated forward clutch which is selectively engaged to put the transmission in the forward operating mode, a hydraulically operated reverse clutch which is selectively engaged to put the transmission in the reverse operating mode, a parking brake, and an actuator for applying the parking brake, comprising hydraulic means responsive to the application of said parking brake for engaging said forward clutch and said reverse clutch simultaneously.

2. A supplemental brake apparatus as in claim 1 wherein said vehicle includes a transmission control valve having two positions, and said hydraulic means includes a first hydraulic circuit between said control valve and said forward clutch.

3. A supplemental brake apparatus as in claim 2 wherein said first hydraulic circuit includes a first shuttle valve.

4. A supplemental brake apparatus as in claim 3 wherein said hydraulic means includes a second hydraulic circuit between said control valve and the other of said clutches.

5. A supplemental brake apparatus as in claim 4 wherein said second hydraulic circuit includes a second shuttle valve.

6. A supplemental brake apparatus as in claim 5 wherein said hydraulic means includes a third shuttle valve connected between said first hydraulic circuit and said second hydraulic circuit.

7. A supplemental brake apparatus as in claim 1 wherein said vehicle includes a transmission control valve having forward and reverse positions, and said hydraulic means includes a first hydraulic circuit between said control valve and said forward clutch, a first shuttle valve in said first circuit, a second hydraulic circuit between said control valve and said reverse clutch, a second shuttle valve in said second circuit, and a third shuttle valve connected between said first hydraulic circuit and said second hydraulic circuit.

8. A supplemental brake apparatus as in claim 7 wherein said hydraulic means includes a two position valve operated by movement of said parking brake between applied and released positions, and a third hydraulic circuit connects said two position valve between said third shuttle valve and a common connection between said first and second shuttle valves, whereby when said transmission control valve is in either operating position and said parking brake is applied both of said forward and reverse clutches are engaged.

9. A supplemental brake apparatus as in claim 1 wherein said means includes three shuttle valves.

10. A supplemental brake apparatus as in claim 9 wherein a two-position valve operated by said parking brake is interconnected with said three shuttle valves.

11. A supplemental brake apparatus as in claim 10 wherein said two-position valve includes a drain position to which said two-position valve is moved when said parking brake is not applied, and an operating position to which said two-position valve is moved when said parking brake is applied.

* * * * *